June 7, 1960

G. C. ULLMAN 2,939,736

LATCH MECHANISM FOR COVER EQUIPPED
CATTLE AND POULTRY FEEDERS

Filed May 28, 1958

INVENTOR.
GENE C. ULLMAN
BY
Merchant & Merchant
ATTORNEYS

United States Patent Office 2,939,736
Patented June 7, 1960

2,939,736

LATCH MECHANISM FOR COVER EQUIPPED CATTLE AND POULTRY FEEDERS

Gene C. Ullman, R.F.D., Haynes, N. Dak.

Filed May 28, 1958, Ser. No. 738,360

5 Claims. (Cl. 292—127)

My invention relates generally to feeders for cattle, poultry and the like, and particularly to feeders of the type comprising a bin for granular feed having a plurality of feed dispensing openings in its lower end portion and an openable and closeable cover through which the granular material may be deposited periodically in order to replenish the feed supply therewithin.

Not uncommonly feeders of the type immediately above described are filled by mobile mechanical devices such as the power operated scoop shovels mounted upon farm tractors and the like.

The primary object of my invention is the provision of novel means whereby a hinged cover for such a feed bin may be quickly and efficiently opened by engagement with a scoop shovel, immediately prior to dumping of the granular contents of the shovel into the bin.

A further object of my invention is the provision of a device of the class immediately above described which includes a latch carried by the cover and a cooperating strike carried by the bin in opposed relationship to the hinge means on the cover, said latch comprising a latch dog mounted for movements toward and away from said strike and a pivoted operating lever therefor projecting generally outwardly from the cover and provided at its free outer end with a foot engageable by the power scoop to impart opening movements to the cover.

A further object of my invention is the provision of a device of the class immediately above described in which said foot is provided with a convex undersurface, facilitating engagement therewith by a power scoop or shovel from any given direction and without any material risk of damage thereto or to the latch mechanism associated therewith.

A still further object of my invention is the provision of a device of the class above described in which conventional secondary latch mechanism is provided for maintaining the cover in a raised position against the action of gravity, said secondary latch mechanism being rendered inoperative, whereby to permit the cover to return to a closed position under the action of gravity, upon raising movements being imparted to said cover (upon re-engagement and lifting of said shoe by the power shovel) subsequent to the bin refilling operation.

A still further object of my invention is the provision of a device of the class above described which is inexpensive to produce, which has a minimum of working parts, which is rugged and durable in construction, and efficient and time saving in operation.

The above and still further objects of my invention will become apparent from the following detailed specification, appended claims and attached drawings.

Referring to the drawings wherein like characters indicate like parts throughout the several views.

Figure 1:
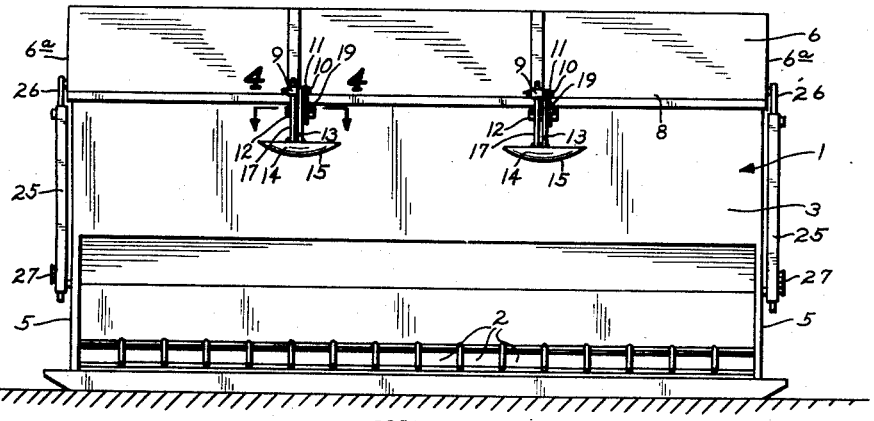
Fig. 1 is a view in front elevation of my novel feed bin and cover combination.
Figure 3:
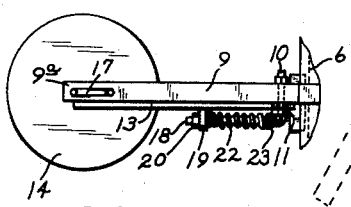
Fig. 3 is an enlarged fragmentary view in top plan as seen substantially from the line 3—3 of Fig. 2.

Referring with greater particularity to the drawings, the numeral 1 indicates in its entirety a feed bin, shown as being generally rectangular in form and having a plurality of feed dispensing openings 2 in its front and rear walls 3 and 4 respectively. The opposite end walls of the bin 1 are identical and therefore are similarly identified by the numeral 5.

Figure 2:
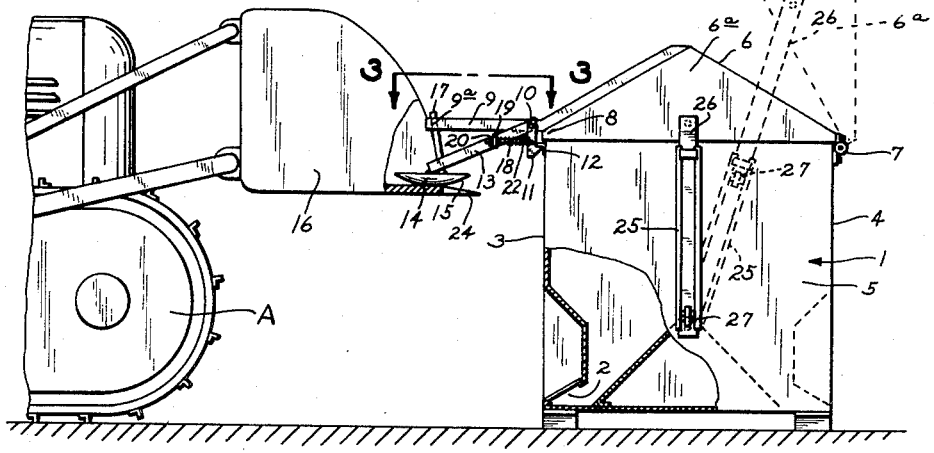
Fig. 2 is a view in end elevation of my novel bin and cover and illustrating operation thereof, some parts being broken away and some parts shown in section.

A conventional peaked roof or cover 6 for the bin 1 is hingedly secured to the upper portion of the rear wall 4 on a horizontal axis, as indicated at 7, for swinging movements from the closed full line position of Fig. 2 to the open dotted line position thereof.

Rigidly secured to the front edge portion 8 of the cover 6 and projecting generally outwardly therefrom is a lifting bar 9. Pivotally secured to the inner end of the lifting bar 9 on a horizontal axis, as indicated at 10, and depending from said lifting bar 9 is a latch dog 11. The latch dog 11 is movable toward and away from a cooperating strike or keeper 12 fast on the upper end portion of the front wall 3 of the bin 1. Also pivotally secured to the inner end portion of the lifting bar 9, preferably and as shown by the latch dog pivoting means 10, is an operating lever 13 for the latch dog 11. Preferably and as shown, the operating lever 13 projects outwardly and downwardly from the cover 6 and terminates in an enlarged shoe 14 below the plane of the projected free end of the lifting bar 9. The shoe 14 is shown as having a convex bottom surface 15 which facilitates engagement thereof by a conventional power scoop or shovel 16 associated with a tractor A or the like, as shown in Fig. 2. Rigidly secured to the shoe-equipped end of the operating lever 13 and projecting upwardly therefrom is a guide rod 17 having sliding engagement with the extended end portion 9a of the lifting bar 9.

Figure 4:
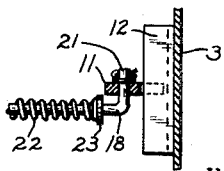
Fig. 4 is an enlarged fragmentary view partly in section and partly in top plan as seen from the line 4—4 of Fig. 1.

A rigid link 18 has its outer end portion slidably received within an ear 19 which projects laterally outwardly from the intermediate portion of the operating lever 13 and is provided with an enlarged nut 20 which limits inward movement of the link 18 with respect to the ear 19 and lever 13. The inner end of the link 18 is bent at right angles to provide a pivot pin 21 which projects through the outer end portion of the latch dog 11, see particularly Fig. 4. A coil compression spring 22 is received over the link 18 intermediate the ear 19 and a stop collar 23 on the inner end of the link 18. In this manner, the latch dog 11 is biased toward engagement with the strike 12, thereby assuring an automatic latching relationship between the latch dog 11 and the strike 12 as the cover 6 returns from the open dotted line position of Fig. 1 to the full line position thereof, under the action of gravity.

In operation, the operator of a tractor A having a power scoop 16 thereon, fills the scoop with granular feed from a suitable primary supply source, not shown. As he approaches the feed pin 1, the leading edge 24 of the scoop 16 is caused to engage the convex undersurface 15 of the shoe 14 and lifting movements are imparted to the operating lever 13 whereby to release the latch dog 11 from engagement with the strike 12. Further upward movements of the scoop 16 cause the operating lever 13 and shoe 14 to operatively engage the lifting bar 9.

For the purpose of holding the cover substantially in the open dotted line position of Fig. 2, the sides 5 of the bin 1 and the sides 6a of the cover 6 have pivotally secured thereto telescoping arms 25 and 26 respectively which are provided with conventional latch mechanism, identified in its entirety by the numeral 27. The latch mechanism 27 forms no part of the instant invention and hence is not shown in detail. It suffices to state that such latch mechanism preferably is of the type wherein automatic unlatching, for the purpose of permitting the cover to assume a closed position under the action of gravity, may be accomplished by lifting of the cover beyond its latching position after the filling operation. Here again, this may be accomplished by re-engagement of the shoe 14 by the leading edge 24 of the scoop 16, as shown by the dotted lines in Fig. 2.

Because of the length of the bin 1 and cover 6, it will be observed that two identical latch mechanisms of the type above described are shown in Fig. 1.

My invention has been thoroughly tested and found to be completely satisfactory for the accomplishment of the above objects, and while I have shown a preferred embodiment thereof, I wish it to be specifically understood that same is capable of modification without departure from the scope and spirit of the appended claims.

What I claim is:

1. A latch mechanism adapted to engage a keeper, said latch mechanism comprising a latch adapted to be secured to a member and a cooperating strike adapted to be secured to another member in opposed relationship, said latch comprising a latch dog pivotally mounted on a horizontal axis for movements toward and away from said strike, and a pivoted operating lever therefor extending forwardly from said member, means yieldingly biasing said latch dog toward engagement with said keeper, a lifting bar extending forwardly from said member and having its projected end above the plane of the free end of said lever and operatively engageable thereby when said lever is lifted in a latch releasing direction, and a shoe on the extended end of said operating lever adapted to be engaged by lifting means.

2. The structure defined in claim 1 in which said shoe is provided with a convex undersurface.

3. The structure defined in claim 1 in further combination with a guide rod carried by said operating lever and having sliding engagement with the extended end of said lifting bar.

4. The structure defined in claim 3 in which the latch dog and operating lever therefor are mounted on a common axis and in which said yielding means comprises a coil compression spring interposed between said latch dog and operating lever.

5. The structure defined in claim 4 in further combination with a rigid link connecting said latch dog and said operating lever extending axially through said coil compression spring and positively coupling said latch dog and said lever together for common lifting movements but permitting independent movement of said latch dog in a direction away from said strike against bias of said spring.

References Cited in the file of this patent
UNITED STATES PATENTS

| | | |
|---|---|---|
| 1,937,978 | Miller | Dec. 5, 1933 |
| 2,522,635 | Pittenger | Sept. 19, 1950 |
| 2,660,149 | Jolly | Nov. 24, 1953 |